United States Patent
Liu et al.

(10) Patent No.: US 10,750,496 B2
(45) Date of Patent: Aug. 18, 2020

(54) DATA TRANSMISSION METHOD AND APPARATUS

(71) Applicant: Huawei Technologies Co., Ltd., Shenzhen (CN)

(72) Inventors: Qi Liu, Shanghai (CN); Yi Zhang, Shanghai (CN); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 16/170,353

(22) Filed: Oct. 25, 2018

(65) Prior Publication Data

US 2019/0069292 A1 Feb. 28, 2019

Related U.S. Application Data

(63) Continuation of application No. PCT/CN2017/080234, filed on Apr. 12, 2017.

(30) Foreign Application Priority Data

Apr. 26, 2016 (CN) .......................... 2016 1 0266409

(51) Int. Cl.
*H04W 72/04* (2009.01)
*H04W 72/12* (2009.01)

(52) U.S. Cl.
CPC ....... *H04W 72/0446* (2013.01); *H04W 72/04* (2013.01); *H04W 72/1289* (2013.01)

(58) Field of Classification Search
CPC ............ H04W 72/0446; H04W 72/04; H04W 72/1289; H04W 72/0413
See application file for complete search history.

(56) References Cited

U.S. PATENT DOCUMENTS

| 9,253,766 | B2 * | 2/2016 | Yang ................... H04B 7/2656 |
| 2007/0140166 | A1 | 6/2007 | Eichinger et al. |
| 2012/0230232 | A1 * | 9/2012 | Ji ....................... H04W 72/1289 370/280 |

(Continued)

FOREIGN PATENT DOCUMENTS

| CN | 101360025 A | 2/2009 |
| CN | 102201859 A | 9/2011 |
| CN | 105517061 A | 4/2016 |

(Continued)

*Primary Examiner* — Afshawn M Towfighi
(74) *Attorney, Agent, or Firm* — Slater Matsil, LLP (57) ABSTRACT

This application provides a data transmission method and apparatus. The method performed by a network node includes: receiving an uplink data transmission request sent by a terminal, where the uplink data transmission request is used to request to allocate an uplink transmission resource; allocating an uplink transmission resource of a first subframe according to the uplink data transmission request, where the first subframe is an uplink subframe or a downlink subframe; sending scheduling control information to the terminal, where the scheduling control information is used to instruct the terminal to send data on the uplink transmission resource of the first subframe; and if the first subframe is a downlink subframe, stopping sending data in the first subframe, and receiving data on the uplink transmission resource of the first subframe.

20 Claims, 5 Drawing Sheets

(56) References Cited

U.S. PATENT DOCUMENTS

2014/0036859 A1   2/2014   Ekpenyong et al.
2015/0230265 A1   8/2015   Pecen et al.

FOREIGN PATENT DOCUMENTS

| EP | 1799001 A1 | 6/2007 |
| EP | 2498419 A2 | 9/2012 |
| EP | 2802091 A1 | 11/2014 |
| EP | 3404960 A1 | 11/2018 |
| JP | 2014514797 A | 6/2014 |
| WO | 2008078968 A1 | 7/2008 |

\* cited by examiner

FIG. 9

DATA TRANSMISSION METHOD AND APPARATUS

CROSS-REFERENCE TO RELATED APPLICATIONS

This application is a continuation of International Application No. PCT/CN2017/080234, filed on Apr. 12, 2017, which claims priority to Chinese Patent Application No. 201610266409.7, filed on Apr. 26, 2016. The disclosures of the aforementioned applications are hereby incorporated by reference in their entireties.

TECHNICAL FIELD

Embodiments of the present invention relate to communications technologies, and in particular, to a data transmission method and apparatus.

BACKGROUND

Time division duplex (TDD) is one of full-duplex communications technologies used in a mobile telecommunication system. In a TDD mode, uplink data and downlink data are transmitted in different timeslots on a same carrier. That is, the uplink data and the downlink data are transmitted at different times.

Figures 1, 2:
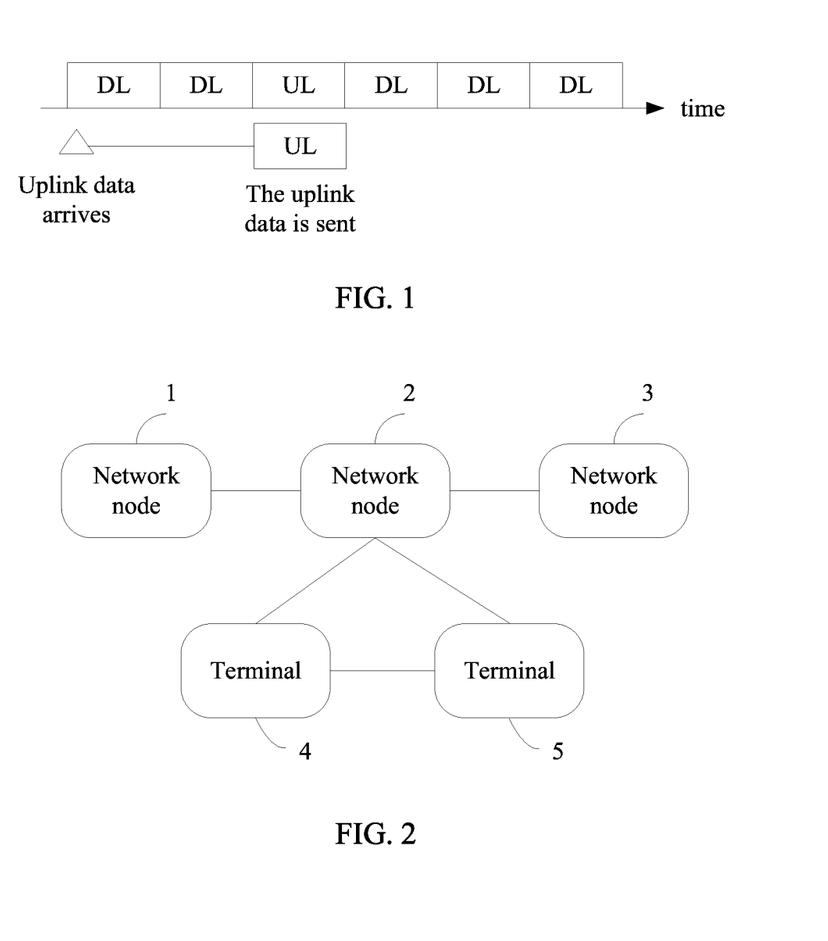
FIG. 1 is a schematic diagram of uplink data transmission in an existing network.
FIG. 2 is a schematic diagram of an application scenario of a data transmission method according to an embodiment of the present invention.

A frame structure of the TDD mode includes an uplink subframe and a downlink subframe. The uplink subframe is used to transmit the uplink data, and the downlink subframe is used to transmit the downlink data. FIG. 1 is a schematic diagram of uplink data transmission in an existing network. In the figure, UL represents an uplink subframe, and DL represents a downlink subframe. As shown in FIG. 1, when a subframe at a time point at which uplink data arrives is a downlink subframe (DL), the uplink data cannot be transmitted, and can be sent only when a next uplink subframe (UL) arrives.

In applications of an existing network, a data volume of a downlink service is usually greater than a data volume of an uplink service. Therefore, there is a relatively small quantity of uplink subframes. For some low-latency services, a wait time for uplink data transmission is quite long, greatly affecting quality of service (QoS) satisfaction of the low-latency services.

SUMMARY

Embodiments of the present invention provide a data transmission method and apparatus, so as to avoid interference caused by downlink data to uplink data and ensure QoS satisfaction of a low-latency service.

According to a first aspect, an embodiment of the present invention provides a data transmission method. The method includes receiving, by a network node, an uplink data transmission request sent by the terminal for requesting the network node to allocate an uplink transmission resource to a terminal. The method further includes allocating an uplink transmission resource of a first subframe to the terminal, where the first subframe is an uplink subframe or a downlink subframe. The method further includes sending, to the terminal, scheduling control information that is used to instruct the terminal to send data on the uplink transmission resource of the first subframe. The method further includes if the first subframe is a downlink subframe, stopping, by the network node, sending data in the first subframe, and receiving, on the uplink transmission resource of the first subframe, data sent by the terminal. According to the method in this embodiment, a transmission resource of a downlink subframe may be preempted for sending uplink data, thereby reducing a wait time for transmitting uplink data. In addition, the network node stops sending data in the downlink subframe, thereby avoiding interference caused by downlink data to uplink data and ensuring QoS satisfaction of a low-latency service.

In a possible design, if the first subframe is a downlink subframe, the method further includes sending, by the network node to a network node in a neighboring cell, first control information that is used to instruct the network node in the neighboring cell to stop sending data in the first subframe. The method further includes causing the network node in the neighboring cell to stop sending data in the first subframe. This avoids that downlink data sent by the network node in the neighboring cell causes interference to uplink data, and ensures data transmission quality.

In a possible design, if the first subframe is a downlink subframe and a cell in which the network node is located is covered by a macro cell, the method further includes sending, by the network node to a network node in the macro cell, second control information that is used to instruct the network node in the macro cell to stop sending data in the first subframe. The method further includes causing the network node in the macro cell to stop sending data in the first subframe. This avoids that downlink data sent by the network node in the macro cell affects uplink data transmission, and ensures data transmission quality.

In a possible design, the sending, by the network node, scheduling control information to the terminal includes sending, by the network node, the scheduling control information to the terminal in a second subframe, where the second subframe is a subframe before the first subframe.

In a possible design, the receiving, by a network node, an uplink data transmission request sent by a terminal includes: receiving, by the network node in a third subframe, the uplink data transmission request sent by the terminal. The third subframe is a subframe before the second subframe, an inter-subframe space between the third subframe and the first subframe is k, and k is a positive integer greater than 1.

According to a second aspect, an embodiment of the present invention provides a data transmission method. The method includes sending, by a terminal to a network node, an uplink data transmission request that is used to request the network node to allocate an uplink transmission resource to the terminal. The method further includes receiving scheduling control information sent by the network node. The method further includes sending data on an uplink transmission resource of a first subframe based on the scheduling control information. The method further includes, if the first subframe is a downlink subframe, stopping, by the terminal, receiving data in the first subframe. According to the method in this embodiment, regardless of whether the first subframe is an uplink subframe or a downlink subframe, the terminal can send data on the uplink transmission resource of the first subframe. This reduces a wait time for sending uplink data and ensures QoS of a low-latency service.

In a possible design, the receiving, by the terminal, scheduling control information sent by the network node includes receiving, by the terminal in a second subframe, the scheduling control information sent by the network node, where the second subframe is a subframe before the first subframe.

In a possible design, the sending, by a terminal, an uplink data transmission request to a network node includes sending, by the terminal, the uplink data transmission request to the network node in the third subframe, where the third subframe is a subframe before the second subframe. An inter-subframe space between the third subframe and the first subframe is k, and k is a positive integer.

According to a third aspect, an embodiment of the present invention provides a data transmission apparatus. The apparatus includes a receiving module, configured to receive an uplink data transmission request sent by a terminal, where the uplink data transmission request is used to request a network node to allocate an uplink transmission resource to the terminal. The apparatus further includes an allocation module, configured to allocate an uplink transmission resource of a first subframe to the terminal according to the uplink data transmission request, where the first subframe is an uplink subframe or a downlink subframe. The apparatus further includes a sending module, configured to send scheduling control information to the terminal, where the scheduling control information is used to instruct the terminal to send data on the uplink transmission resource of the first subframe. The apparatus further includes a processing module, configured to, if the first subframe is a downlink subframe, control the sending module to stop sending data in the first subframe, and control the receiving module to receive, on the uplink transmission resource of the first subframe, data sent by the terminal.

In a possible design, if the first subframe is a downlink subframe, the sending module is further configured to send first control information to a network node in a neighboring cell, where the first control information is used to instruct the network node in the neighboring cell to stop sending data in the first subframe.

In a possible design, if the first subframe is a downlink subframe and a cell in which the data transmission apparatus is located is covered by a macro cell, the sending module is further configured to send second control information to a network node in the macro cell, where the second control information is used to instruct the network node in the macro cell to stop sending data in the first subframe.

In a possible design, the sending module is configured to send the scheduling control information to the terminal in a second subframe, where the second subframe is a subframe before the first subframe.

In a possible design, the receiving module is configured to receive, in a third subframe, the uplink data transmission request sent by the terminal, where the third subframe is a subframe before the second subframe. An inter-subframe space between the third subframe and the first subframe is k, and k is a positive integer greater than 1.

For beneficial effects of the apparatus provided in the foregoing third aspect and all possible design manners of the foregoing third aspect, refer to beneficial effects brought by the method provided in the foregoing first aspect and all possible design manners of the first aspect. Details are not described herein again.

According to a fourth aspect, an embodiment of the present invention provides a data transmission apparatus. The apparatus includes a sending module, configured to send an uplink data transmission request to a network node, where the uplink data transmission request is used to request the network node to allocate an uplink transmission resource to a terminal. The apparatus further includes a receiving module, configured to receive scheduling control information sent by the network node. The sending module is further configured to send data on an uplink transmission resource of a first subframe based on the scheduling control information, and the first subframe is an uplink subframe or a downlink subframe. The apparatus further includes a processing module, further configured to, if the first subframe is a downlink subframe, control the receiving module to stop receiving data in the first subframe.

In a possible design, the receiving module is configured to receive, in a second subframe, the scheduling control information sent by the network node, where the second subframe is a subframe before the first subframe.

In a possible design, sending, by the sending module, the uplink data transmission request to the network node includes sending, by the sending module, the uplink data transmission request to the network node in a third subframe, where the third subframe is a subframe before the second subframe. An inter-subframe space between the third subframe and the first subframe is k, and k is a positive integer greater than 1.

For beneficial effects of the apparatus provided in the foregoing fourth aspect and all possible design manners of the foregoing fourth aspect, refer to beneficial effects brought by the method provided in the foregoing second aspect and all possible design manners of the second aspect. Details are not described herein again.

BRIEF DESCRIPTION OF THE DRAWINGS

To describe the technical solutions in the embodiments of the present invention more clearly, the following briefly describes the accompanying drawings required for describing the embodiments.

DETAILED DESCRIPTION OF ILLUSTRATIVE EMBODIMENTS

FIG. 2 is a schematic diagram of an application scenario of a data transmission method according to an embodiment of the present invention. The scenario includes a network node 1, a network node 2, a network node 3, a terminal 4, and a terminal 5. Main functions of a network node are scheduling and allocating an air interface resource, and sending a control message and data to a terminal on a specified air interface resource. The control message includes information about an air interface resource allocated to a user of each terminal. Main functions of the terminal are receiving and sending data based on the control message sent by the network node, and feeding back some control messages to the network node. For example, the terminal feeds back messages such as a HARQ ACK/ NACK, a CQI, and an SRS to the network node. An interface between the network node and the terminal is an air interface, and an interface between terminals is also an air interface. Network nodes may communicate with each other using an X2 interface or an air interface.

In addition, the data transmission method according to this embodiment of the present invention is mainly applied to a low-latency high-reliable service, for example, an ultra-reliable/low-latency machine type communications (uMTC) service, so as to resolve a technical problem that a wait time for transmitting uplink data for a low-latency service is quite long, and QoS satisfaction of the low-latency service is greatly affected.

Figure 3:
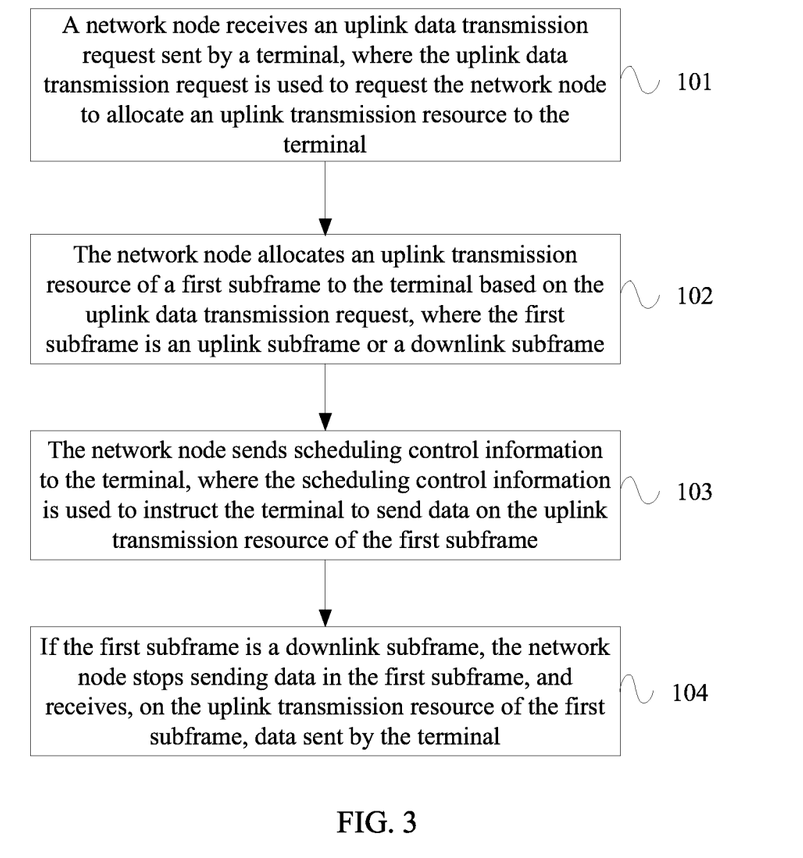
FIG. 3 is a flowchart of a data transmission method according to Embodiment 1 of the present invention.

FIG. 3 is a flowchart of a data transmission method according to Embodiment 1 of the present invention. As shown in FIG. 3, the method includes the following steps.

Step 101: A network node receives an uplink data transmission request sent by a terminal, where the uplink data transmission request is used to request the network node to allocate an uplink transmission resource to the terminal.

In this embodiment, the terminal may be a terminal device such as a mobile phone, a computer, a tablet computer, or a smartwatch. When the terminal needs to send uplink data, the terminal sends the uplink data transmission request to the network node. The network node allocates an uplink transmission resource to the terminal according to the uplink data transmission request.

Step 102: The network node allocates an uplink transmission resource of a first subframe to the terminal according to the uplink data transmission request, where the first subframe is an uplink subframe or a downlink subframe.

In this embodiment, regardless of whether the first subframe is an uplink subframe or a downlink subframe, the network node allocates the uplink transmission resource of the first subframe to the terminal. The network node and the terminal may agree on an inter-subframe space being N during initialization establishment. For example, when N=4, after receiving the uplink data transmission request, the network node allocates an uplink transmission resource to the terminal in a fourth subframe that is after a subframe in which the uplink data transmission request is received. Alternatively, the network node may allocate an uplink transmission resource to the terminal in an idle subframe that is closest to a subframe in which the uplink data transmission request is received. Alternatively, the terminal may carry an inter-subframe space N in the uplink data transmission request, to request the network node to allocate, in an $N^{th}$ subframe that is after a subframe in which the uplink data transmission request is received, an uplink transmission resource to the terminal.

Step 103: The network node sends scheduling control information to the terminal, where the scheduling control information is used to instruct the terminal to send data on the uplink transmission resource of the first subframe.

In this embodiment, the scheduling control information may include attribute information of the uplink transmission resource, for example, a quantity of resource blocks (RB), a modulation scheme, or a transport block size (TBS). After receiving the scheduling control information, the terminal sends data on the uplink transmission resource of the first subframe based on content of the scheduling control information.

Step 104: If the first subframe is a downlink subframe, the network node stops sending data in the first subframe, and receives, on the uplink transmission resource of the first subframe, data sent by the terminal.

In this embodiment, if the first subframe is a downlink subframe, the network node needs to stop sending data in the first subframe, so as to avoid interference caused by downlink data to uplink data, so that the network node can receive correct uplink data in the first subframe.

According to the data transmission method provided in this embodiment, the network node receives the uplink data transmission request sent by the terminal for requesting the network node to allocate an uplink transmission resource to the terminal, allocates the uplink transmission resource of the first subframe to the terminal according to the uplink data transmission request, and sends the scheduling control information to the terminal, so that the terminal sends data on the uplink transmission resource of the first subframe. If the first subframe is a downlink subframe, the network node stops sending data in the first subframe, and receives, on the uplink transmission resource of the first subframe, data sent by the terminal. When uplink data is sent, a transmission resource of a downlink subframe may be preempted, thereby reducing a wait time for transmitting uplink data. In addition, the network node stops sending data in the downlink subframe, thereby avoiding interference caused by downlink data to uplink data and ensuring QoS satisfaction of a low-latency service.

Figure 4:
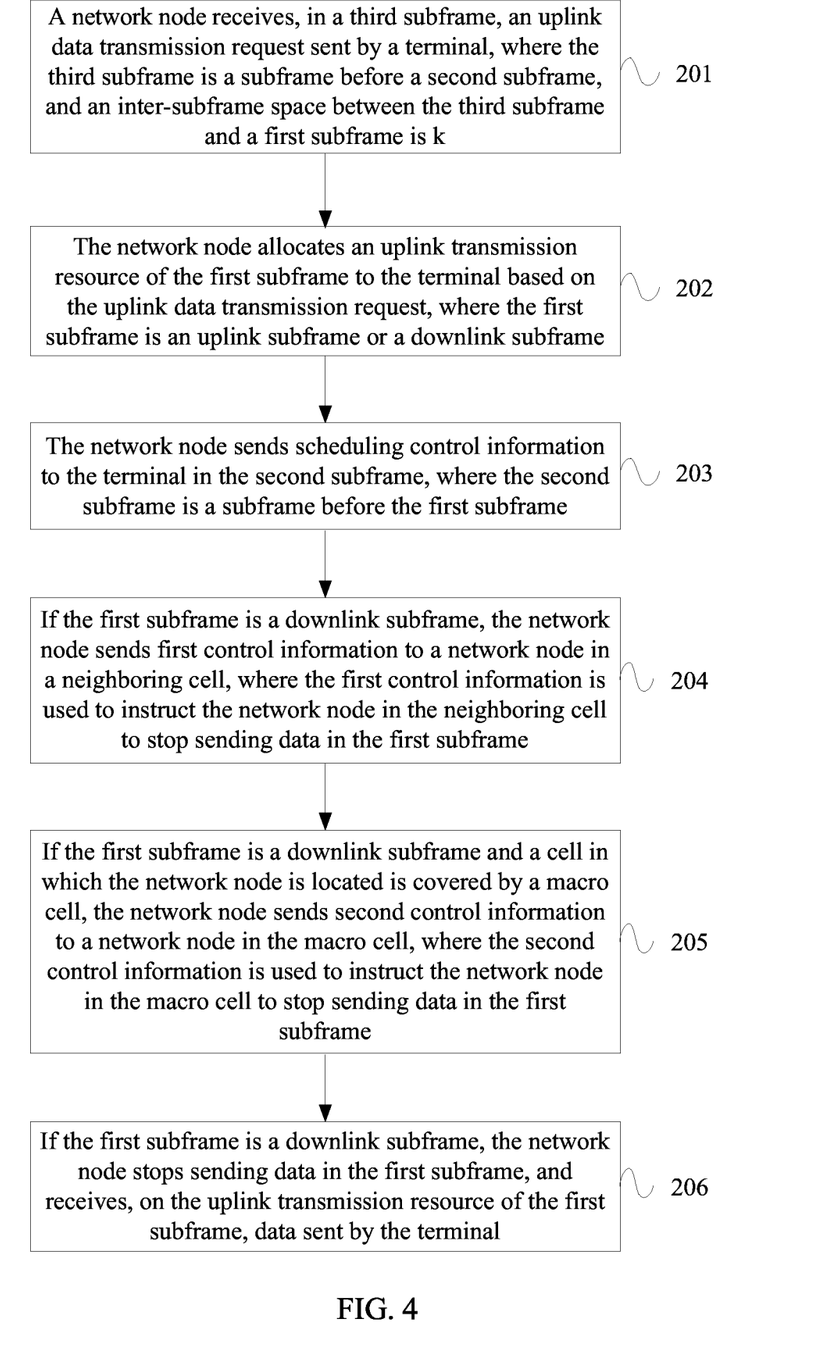
FIG. 4 is a flowchart of a data transmission method according to Embodiment 2 of the present invention.

FIG. 4 is a flowchart of a data transmission method according to Embodiment 2 of the present invention. In this embodiment, a specific process is described. The process includes, if a first subframe is a downlink subframe, a network node further sends control information to a network node in a neighboring cell or a network node in a macro cell, so that the network node in the neighboring cell or the network node in the macro cell stops sending downlink data in the first subframe. As shown in FIG. 4, the method includes the following steps.

Step 201: A network node receives, in a third subframe, an uplink data transmission request sent by a terminal, where the third subframe is a subframe before a second subframe, and an inter-subframe space between the third subframe and a first subframe is k, and k is a positive integer greater than 1.

In this embodiment, the second subframe is a subframe in which scheduling control information is sent. If the third subframe is numbered n, the first subframe is numbered (n+k). If the network node receives, in subframe n, the uplink data transmission request sent by the terminal, the network node allocates an uplink transmission resource of subframe (n+k) to the terminal.

Step 202: The network node allocates an uplink transmission resource of the first subframe to the terminal according to the uplink data transmission request, where the first subframe is an uplink subframe or a downlink subframe.

Step 203: The network node sends scheduling control information to the terminal in the second subframe, where the second subframe is a subframe before the first subframe.

In this embodiment, the second subframe is a subframe between the third subframe and the first subframe. For example, if the first subframe is subframe 4 and the third subframe is subframe 1, the second subframe may be subframe 2 or subframe 3.

Step 204: If the first subframe is a downlink subframe, the network node sends first control information to a network node in a neighboring cell, where the first control information is used to instruct the network node in the neighboring cell to stop sending data in the first subframe.

In this embodiment, when the network node sends data in a downlink subframe, a transmit signal is quite strong, and causes great interference to uplink reception. Therefore, no data sent by the terminal can be correctly received. To avoid that downlink data sent by the network node in the neighboring cell interferes with uplink data, if the first subframe is a downlink subframe, the network node sends the first control information to the network node in the neighboring cell, so that the network node in the neighboring cell stops sending data in the first subframe.

Optionally, if the first subframe is a downlink subframe and a cell in which the network node is located is covered by a macro cell, the method may further include step 205.

Step 205: If the first subframe is a downlink subframe and a cell in which the network node is located is covered by a macro cell, the network node sends second control information to a network node in the macro cell, where the second control information is used to instruct the network node in the macro cell to stop sending data in the first subframe.

This embodiment is mainly applied to a heterogeneous network (HetNet). The macro cell covers a plurality of micro cells. That is, a plurality of micro base stations is deployed in a coverage area of a macro base station. Each micro base station serves a user within a specific area. Coverage of the macro base station overlaps with coverage of the micro base stations. If the cell in which the network node in this embodiment is located is a micro cell and is covered by the macro cell, the network node further needs to send the second control information to the network node in the macro cell, so that the network node in the macro cell stops sending data in the first subframe.

It should be noted that there is no specific time sequence restriction on step 203, step 204, and step 205.

Step 206: If the first subframe is a downlink subframe, the network node stops sending data in the first subframe, and receives, on the uplink transmission resource of the first subframe, data sent by the terminal.

According to the data transmission method provided in this embodiment, the network node receives, in the third subframe, the uplink data transmission request sent by the terminal, allocates the uplink transmission resource of the first subframe to the terminal according to the uplink data transmission request, and sends the scheduling control information to the terminal in the second subframe that is before the first subframe. If the first subframe is a downlink subframe, the network node may further send the first control information to the network node in the neighboring cell, so that the network node in the neighboring cell stops sending data in the first subframe. If the first subframe is a downlink subframe and the cell in which the network node is located is covered by the macro cell, the network node may further send the second control information to the network node in the macro cell, so that the network node in the macro cell stops sending data in the first subframe. This avoids that downlink data sent by the network node in the neighboring cell or the network node in the macro cell interferes with uplink data, ensuring reliability in sending uplink data in a downlink subframe, and improving QoS of a low-latency service.

Figure 5:
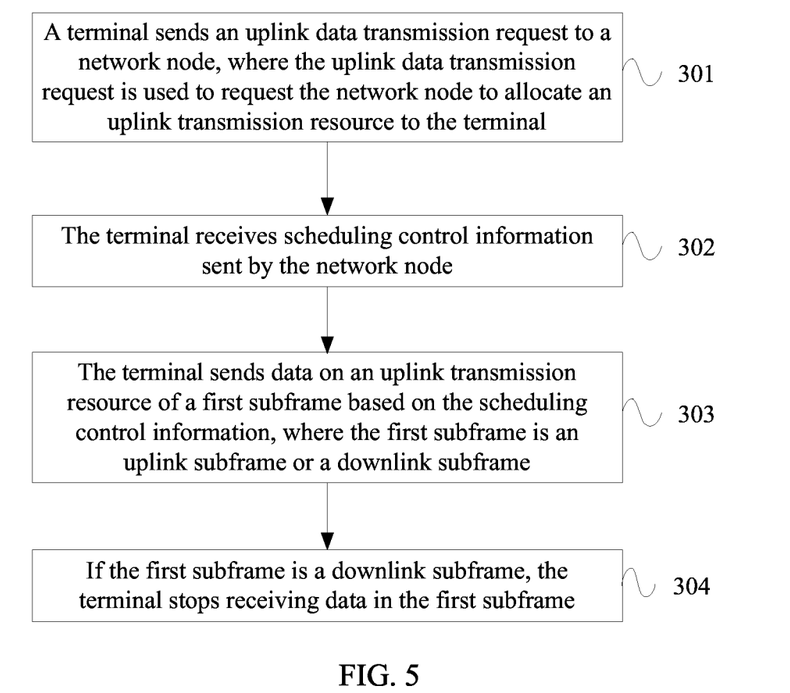
FIG. 5 is a flowchart of a data transmission method according to Embodiment 3 of the present invention.

FIG. 5 is a flowchart of a data transmission method according to Embodiment 3 of the present invention. In a specific process in this embodiment, a terminal requests a network node to allocate an uplink transmission resource, and sends uplink data on an uplink transmission resource of a first subframe based on scheduling control information sent by the network node. As shown in FIG. 5, the method includes the following steps.

Step 301: A terminal sends an uplink data transmission request to a network node, where the uplink data transmission request is used to request the network node to allocate an uplink transmission resource to the terminal.

In this embodiment, the terminal may be a terminal device such as a mobile phone, a computer, a tablet computer, or a smartwatch. When the terminal needs to send uplink data, the terminal sends the uplink data transmission request to the network node. The network node allocates an uplink transmission resource to the terminal according to the uplink data transmission request.

Step 302: The terminal receives scheduling control information sent by the network node.

The scheduling control information is used to instruct the terminal to send data on an uplink transmission resource of a first subframe.

In this embodiment, the scheduling control information may include attribute information of the uplink transmission resource, for example, a quantity of resource blocks (RB), a modulation scheme, or a transport block size (TBS). After receiving the scheduling control information, the terminal sends data on the uplink transmission resource of the first subframe based on content of the scheduling control information.

Step 303: The terminal sends data on an uplink transmission resource of a first subframe based on the scheduling control information, where the first subframe is an uplink subframe or a downlink subframe.

In this embodiment, regardless of whether the first subframe is an uplink subframe or a downlink subframe, the terminal can send data on the uplink transmission resource of the first subframe, thereby reducing a wait time for sending uplink data.

Step 304: If the first subframe is a downlink subframe, the terminal stops receiving data in the first subframe.

In this embodiment, to reduce interference caused by downlink data to uplink data, if the first subframe is a downlink subframe, the terminal stops receiving data in the first subframe.

According to the data transmission method provided in this embodiment, the terminal sends the uplink data transmission request to the network node, so that the network node allocates an uplink transmission resource to the terminal, receives the scheduling control information sent by the network node, and sends data on the uplink transmission resource of the first subframe based on the scheduling control information. If the first subframe is a downlink subframe, the terminal stops receiving data in the first subframe. Regardless of whether the first subframe is an uplink subframe or a downlink subframe, the terminal can send data on the uplink transmission resource of the first subframe. This reduces a wait time for sending uplink data and ensures QoS of a low-latency service.

Optionally, the receiving, by the terminal, scheduling control information sent by the network node includes receiving, by the terminal in a second subframe, the scheduling control information sent by the network node, where the second subframe is a subframe before the first subframe.

Optionally, the sending, by a terminal, an uplink data transmission request to a network node includes sending, by the terminal, the uplink data transmission request to the network node in a third subframe, where the third subframe is a subframe before the second subframe, and an inter-subframe space between the third subframe and the first subframe is k, and k is a positive integer greater than 1.

In this embodiment, if the third subframe is numbered n, the first subframe is numbered n+k. The second subframe is a subframe between subframe n and subframe (n+k). If the network node receives, in the subframe n, the uplink data transmission request sent by the terminal, the network node allocates an uplink transmission resource to the terminal in the subframe (n+k). Regardless of whether the subframe (n+k) is an uplink subframe or a downlink subframe, the network node allocates an uplink transmission resource to the terminal in the subframe (n+k). This reduces a wait time for transmitting uplink data and ensures QoS of a low-latency service.

Figure 6:
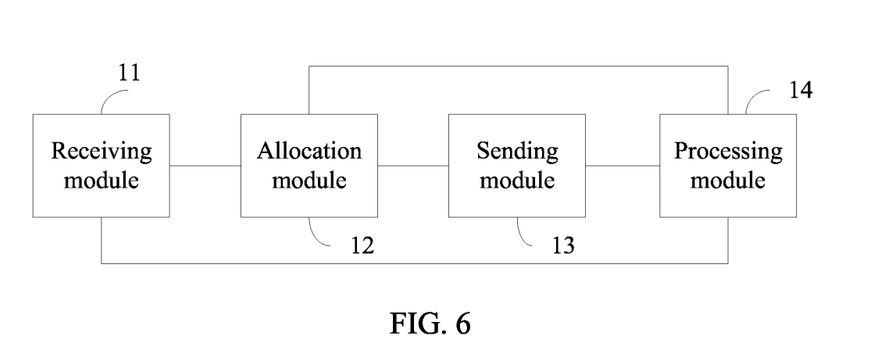
FIG. 6 is a schematic structural diagram of a data transmission apparatus according to Embodiment 4 of the present invention.

FIG. 6 is a schematic structural diagram of a data transmission apparatus according to Embodiment 4 of the present invention. As shown in FIG. 6, the apparatus includes a receiving module 11, an allocation module 12, a sending module 13, and a processing module 14. The receiving module 11 is configured to receive an uplink data transmission request sent by a terminal, where the uplink data transmission request is used to request a network node to allocate an uplink transmission resource to the terminal. The allocation module 12 is configured to allocate an uplink transmission resource of a first subframe to the terminal according to the uplink data transmission request, where the first subframe is an uplink subframe or a downlink subframe. The sending module 13 is configured to send scheduling control information to the terminal, where the scheduling control information is used to instruct the terminal to send data on the uplink transmission resource of the first subframe. The processing module 14 is configured to, if the first subframe is a downlink subframe, control the sending module 13 to stop sending data in the first subframe, and control the receiving module 11 to receive, on the uplink transmission resource of the first subframe, data sent by the terminal.

The apparatus according to this embodiment may be configured to execute the technical solutions of the method embodiment shown in FIG. 3, implementation principles and technical effects thereof are similar to those in the method embodiment, and details are not described herein again.

Optionally, if the first subframe is a downlink subframe, the sending module 13 is further configured to send first control information to a network node in a neighboring cell, where the first control information is used to instruct the network node in the neighboring cell to stop sending data in the first subframe.

Optionally, if the first subframe is a downlink subframe and a cell in which the data transmission apparatus is located is covered by a macro cell, the sending module 13 is further configured to send second control information to a network node in the macro cell, where the second control information is used to instruct the network node in the macro cell to stop sending data in the first subframe.

Optionally, the sending module 13 is configured to send the scheduling control information to the terminal in a second subframe, where the second subframe is a subframe before the first subframe.

Optionally, the receiving module 11 is configured to receive, in a third subframe, the uplink data transmission request sent by the terminal, where the third subframe is a subframe before the second subframe, an inter-subframe space between the third subframe and the first subframe is k, and k is a positive integer greater than 1.

The apparatus according to this embodiment may be configured to execute the technical solutions of the method embodiment shown in FIG. 4, implementation principles and technical effects thereof are similar to those in the method embodiment, and details are not described herein again.

Figure 7:
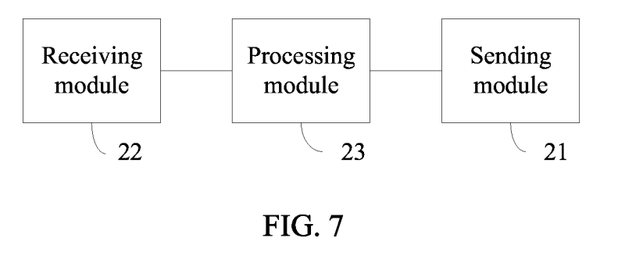
FIG. 7 is a schematic structural diagram of a data transmission apparatus according to Embodiment 5 of the present invention.

FIG. 7 is a schematic structural diagram of a data transmission apparatus according to Embodiment 5 of the present invention. As shown in FIG. 7, the apparatus includes a sending module 21, a receiving module 22, and a processing module 23. The sending module 21 is configured to send an uplink data transmission request to a network node, where the uplink data transmission request is used to request the network node to allocate an uplink transmission resource to the terminal. The receiving module 22 is configured to receive scheduling control information sent by the network node. The sending module 21 is further configured to send data on an uplink transmission resource of a first subframe based on the scheduling control information, where the first subframe is an uplink subframe or a downlink subframe. The processing module 23 is further configured to, if the first subframe is a downlink subframe, control the receiving module 22 to stop receiving data in the first subframe.

The apparatus according to this embodiment may be configured to execute the technical solutions of the method embodiment shown in FIG. 5, implementation principles and technical effects thereof are similar to those in the method embodiment, and details are not described herein again.

Optionally, the receiving module 22 is configured to receive, in a second subframe, the scheduling control information sent by the network node, where the second subframe is a subframe before the first subframe.

Optionally, the sending, by the sending module 21, an uplink data transmission request to a network node includes sending, by the sending module 21, the uplink data transmission request to the network node in a third subframe, where the third subframe is a subframe before the second subframe, an inter-subframe space between the third subframe and the first subframe is k, and k is a positive integer greater than 1.

Figure 8:
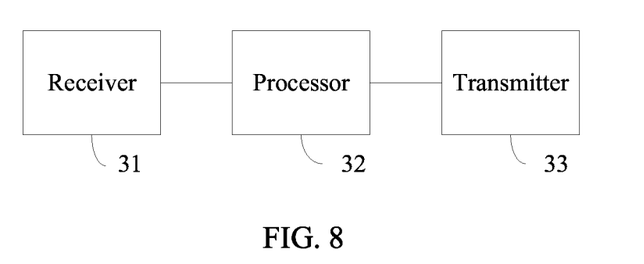
FIG. 8 is a schematic structural diagram of a network node according to Embodiment 6 of the present invention.

FIG. 8 is a schematic structural diagram of a network node according to Embodiment 6 of the present invention. As shown in FIG. 8, the network node includes a receiver 31, a processor 32, and a transmitter 33. The receiver 31 is configured to receive an uplink data transmission request sent by a terminal, where the uplink data transmission request is used to request a network node to allocate an uplink transmission resource to the terminal. The processor 32 is configured to allocate an uplink transmission resource of a first subframe to the terminal according to the uplink data transmission request, where the first subframe is an uplink subframe or a downlink subframe. The transmitter 33 is configured to send scheduling control information to the terminal, where the scheduling control information is used to instruct the terminal to send data on the uplink transmission resource of the first subframe. If the first subframe is a downlink subframe, the processor 32 is further configured to control the transmitter 33 to stop sending data in the first subframe, and control the receiver 31 to receive, on the uplink transmission resource of the first subframe, data sent by the terminal.

Optionally, if the first subframe is a downlink subframe, the transmitter 33 is further configured to send first control information to a network node in a neighboring cell, where the first control information is used to instruct the network node in the neighboring cell to stop sending data in the first subframe.

Optionally, if the first subframe is a downlink subframe and a cell in which the network node is located is covered by a macro cell, the transmitter 33 is further configured to send second control information to a network node in the macro cell, where the second control information is used to instruct the network node in the macro cell to stop sending data in the first subframe.

Optionally, the transmitter 33 is configured to send the scheduling control information to the terminal in a second subframe, where the second subframe is a subframe before the first subframe.

Optionally, the receiver 31 is configured to receive, in a third subframe, the uplink data transmission request sent by the terminal, where the third subframe is a subframe before the second subframe, an inter-subframe space between the third subframe and the first subframe is k, and k is a positive integer greater than 1.

The processor 32 may be a general purpose processor, including a central processing unit (CPU), a network processor (NP), or the like; and may alternatively be a digital signal processor (DSP), an application-specific integrated circuit (ASIC), a field programmable gate array (FPGA), or another programmable logic device, a discrete gate or transistor logic device, or a discrete hardware component.

Optionally, the network node may further include a memory. The memory is coupled with the processor, and is configured to store an operating system, program code, and data. The memory may include a random access memory (RAM), or may include a nonvolatile memory, for example, at least one magnetic disk storage.

The network node according to this embodiment may be configured to execute the technical solutions of the method embodiment shown in FIG. 3 or FIG. 4, implementation principles and technical effects thereof are similar to those in the method embodiment, and details are not described herein again.

Figure 9:
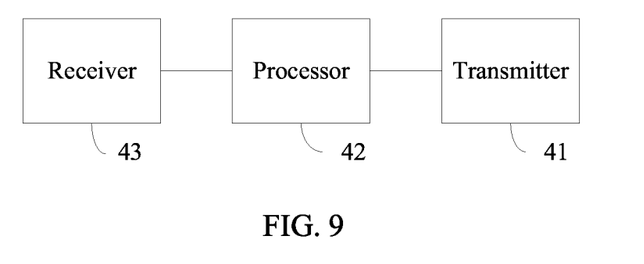
FIG. 9 is a schematic structural diagram of a terminal according to Embodiment 7 of the present invention.

FIG. 9 is a schematic structural diagram of a terminal according to Embodiment 7 of the present invention. As shown in FIG. 9, the terminal includes a transmitter 41, a processor 42, and a receiver 43. The transmitter 41 is configured to send an uplink data transmission request to a network node, where the uplink data transmission request is used to request the network node to allocate an uplink transmission resource to the terminal. The receiver 43 is configured to receive scheduling control information sent by the network node. The transmitter 41 is further configured to send data on an uplink transmission resource of a first subframe based on the scheduling control information, where the first subframe is an uplink subframe or a downlink subframe. If the first subframe is a downlink subframe, the processor 42 is configured to control the receiver 43 to stop receiving data in the first subframe.

Optionally, the receiver 43 is configured to receive, in a second subframe, the scheduling control information sent by the network node, where the second subframe is a subframe before the first subframe.

Optionally, the transmitter 41 is configured to send the uplink data transmission request to the network node in a third subframe, where the third subframe is a subframe before the second subframe, an inter-subframe space between the third subframe and the first subframe is k, and k is a positive integer greater than 1.

The processor 42 may be a general purpose processor, including a CPU, an NP, or the like; and may alternatively be a DSP, an ASIC, an FPGA, or another programmable logic device, a discrete gate or transistor logic device, or a discrete hardware component.

Optionally, the terminal may further include a memory. The memory is coupled with the processor, and is configured to store an operating system, program code, and data. The memory may include a random access memory (RAM), or may include a nonvolatile memory, for example, at least one magnetic disk storage.

The terminal according to this embodiment may be configured to execute the technical solutions of the method embodiment shown in FIG. 5, implementation principles and technical effects thereof are similar to those in the method embodiment, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
   receiving, by a network node, an uplink data transmission request message sent by a terminal, wherein the uplink data transmission request message requests the network node to allocate an uplink transmission resource to the terminal;
   allocating, by the network node, an uplink transmission resource of a first subframe to the terminal according to the uplink data transmission request message, wherein the first subframe is pre-allocated to be an uplink subframe or a downlink subframe;
   sending, by the network node, scheduling control information to the terminal, wherein the scheduling control information instructs the terminal to send data on the uplink transmission resource of the first subframe; and
   when the first subframe is pre-allocated to be the downlink subframe, determining, by the network node, to not send data in the first subframe, and receiving, on the uplink transmission resource of the first subframe, data sent by the terminal.

2. The method according to claim 1, wherein when the first subframe is pre-allocated to be the downlink subframe, the method further comprises:
   sending, by the network node, first control information to another network node in a neighboring cell, wherein the first control information instructs the another network node in the neighboring cell to not send downlink data in the first subframe.

3. The method according to claim 1, wherein when the first subframe is the downlink subframe and the network node is located in a coverage area of a macro cell, the method further comprises:
   sending, by the network node, second control information to another network node in the macro cell, wherein the second control information instructs the another network node in the macro cell not to send downlink data in the first subframe.

4. The method according to claim 1, wherein sending the scheduling control information comprises:

sending, by the network node, the scheduling control information to the terminal in a second subframe, wherein the second subframe is before the first subframe.

5. The method according to claim 4, wherein receiving the uplink data transmission request message comprises:
receiving, by the network node in a third subframe, the uplink data transmission request message sent by the terminal, wherein the third subframe is before the second subframe, and an inter-subframe space between the third subframe and the first subframe is k, and wherein k is a positive integer greater than 1.

6. The method according to claim 1, wherein the scheduling control information comprises a quantity of resource blocks (RBs), a modulation scheme, or a transport block size (TBS).

7. A method, comprising:
sending, by a terminal, an uplink data transmission request message to a network node, wherein the uplink data transmission request message requests the network node to allocate an uplink transmission resource to the terminal;
receiving, by the terminal, scheduling control information sent by the network node;
sending, by the terminal, data on an uplink transmission resource of a first subframe based on the scheduling control information, wherein the first subframe is pre-allocated to be an uplink subframe or a downlink subframe; and
when the first subframe is pre-allocated to be the downlink subframe, determining, by the terminal, to not attempt to receive downlink data from the network node in the first subframe.

8. The method according to claim 7, wherein receiving the scheduling control information comprises:
receiving, by the terminal in a second subframe, the scheduling control information sent by the network node, wherein the second subframe is before the first subframe.

9. The method according to claim 8, wherein sending the uplink data transmission request message comprises:
sending, by the terminal, the uplink data transmission request message to the network node in a third subframe, wherein the third subframe is before the second subframe, wherein an inter-subframe space between the third subframe and the first subframe is k, and wherein k is a positive integer greater than 1.

10. The method according to claim 7, wherein the scheduling control information comprises a quantity of resource blocks (RBs), a modulation scheme, or a transport block size (TBS).

11. An apparatus, comprising:
a processor; and
a non-transitory computer-readable storage medium storing a program to be executed by the processor, the program including instructions for:
receiving, using a receiver of the apparatus, an uplink data transmission request message sent by a terminal, wherein the uplink data transmission request message requests the apparatus to allocate an uplink transmission resource to the terminal;
allocating an uplink transmission resource of a first subframe to the terminal according to the uplink data transmission request message, wherein the first subframe is pre-allocated to be an uplink subframe or a downlink subframe;
sending scheduling control information to the terminal, wherein the scheduling control information instructs the terminal to send data on the uplink transmission resource of the first subframe; and
when the first subframe is pre-allocated to be the downlink subframe, determining not to send downlink data in the first subframe, and receiving, on the uplink transmission resource of the first subframe, data sent by the terminal.

12. The apparatus according to claim ii, wherein the program further includes instructions for:
when the first subframe is pre-allocated to be the downlink subframe, sending first control information to a network node in a neighboring cell, wherein the first control information instructs the network node in the neighboring cell to not send downlink data in the first subframe.

13. The apparatus according to claim 11, wherein the program further includes instructions for:
when the first subframe is pre-allocated to be the downlink subframe and the apparatus is located in a coverage area of a macro cell, sending second control information to a network node in the macro cell, wherein the second control information instructs the network node in the macro cell to stop sending data in the first subframe.

14. The apparatus according to claim 11, wherein the program further includes instructions for:
sending the scheduling control information to the terminal in a second subframe, wherein the second subframe is before the first subframe.

15. The apparatus according to claim 14, wherein the program further includes instructions for:
receiving, in a third subframe, the uplink data transmission request message sent by the terminal, wherein the third subframe is before the second subframe, wherein an inter-subframe space between the third subframe and the first subframe is k, and wherein k is a positive integer greater than 1.

16. The apparatus according to claim ii, wherein the scheduling control information comprises a quantity of resource blocks (RBs), a modulation scheme, or a transport block size (TBS).

17. An apparatus, comprising:
a processor; and
a non-transitory computer-readable storage medium storing a program to be executed by the processor, the program including instructions for:
sending an uplink data transmission request message to a network node, wherein the uplink data transmission request message requests the network node to allocate an uplink transmission resource to the apparatus;
receiving scheduling control information sent by the network node;
sending data on an uplink transmission resource of a first subframe based on the scheduling control information, wherein the first subframe is pre-allocated to be an uplink subframe or a downlink subframe; and
when the first subframe is pre-allocated to be the downlink subframe, determining not to attempt to receive data in the first subframe.

18. The apparatus according to claim 17, wherein the program further includes instructions for:
receiving, in a second subframe, the scheduling control information sent by the network node, wherein the second subframe is before the first subframe.

19. The apparatus according to claim 18, wherein the program further includes instructions for:

sending the uplink data transmission request message to the network node in a third subframe, wherein the third subframe is before the second subframe, wherein an inter-subframe space between the third subframe and the first subframe is k, and wherein k is a positive integer greater than 1.

20. The apparatus according to claim 17, wherein the scheduling control information comprises a quantity of resource blocks (RBs), a modulation scheme, or a transport block size (TBS).

\* \* \* \* \*

UNITED STATES PATENT AND TRADEMARK OFFICE
CERTIFICATE OF CORRECTION

PATENT NO. : 10,750,496 B2
APPLICATION NO. : 16/170353
DATED : August 18, 2020
INVENTOR(S) : Qi Liu et al.

Page 1 of 1

It is certified that error appears in the above-identified patent and that said Letters Patent is hereby corrected as shown below:

In the Claims

In Column 14, Line 10, Claim 12, delete "claim ii" and insert --claim 11--.

In Column 14, Line 40, Claim 16, delete "claim ii" and insert --claim 11--.

Signed and Sealed this
Tenth Day of November, 2020

Andrei Iancu
*Director of the United States Patent and Trademark Office*